(12) United States Patent
Cao et al.

(10) Patent No.: US 11,880,450 B2
(45) Date of Patent: Jan. 23, 2024

(54) METHOD AND APPARATUS FOR UPDATING PASSWORD OF ELECTRONIC DEVICE, DEVICE AND STORAGE MEDIUM

(71) Applicant: Apollo Intelligent Connectivity (Beijing) Technology Co., Ltd., Beijing (CN)

(72) Inventors: Liang Cao, Beijing (CN); Limin Hao, Beijing (CN)

(73) Assignee: APOLLO INTELLIGENT CONNECTIVITY (BEIJING) TECHNOLOGY CO., LTD., Beijing (CN)

(*) Notice: Subject to any disclaimer, the term of this patent is extended or adjusted under 35 U.S.C. 154(b) by 41 days.

(21) Appl. No.: 17/383,193

(22) Filed: Jul. 22, 2021

(65) Prior Publication Data

US 2021/0349989 A1 Nov. 11, 2021

(30) Foreign Application Priority Data

Dec. 17, 2020 (CN) ......................... 202011496887.X

(51) Int. Cl.
*G06F 21/46* (2013.01)
*G06F 16/23* (2019.01)
(Continued)

(52) U.S. Cl.
CPC .......... *G06F 21/46* (2013.01); *G06F 16/2379* (2019.01); *G06F 21/31* (2013.01);
(Continued)

(58) Field of Classification Search
CPC ....... G06F 21/46; G06F 21/31; H04L 9/0825; H04L 9/0863; H04L 9/3226
See application file for complete search history.

(56) References Cited

U.S. PATENT DOCUMENTS 10,212,136 B1  2/2019  Gehret
2009/0260074 A1*  10/2009  De Spiegeleer ........ H04L 67/08
                                                              709/228
(Continued)

FOREIGN PATENT DOCUMENTS

CN       109150907 A    1/2019
CN       109472130 A    3/2019
(Continued)

OTHER PUBLICATIONS

Second Office Action of the parallel application JP2021-110576.
(Continued)

*Primary Examiner* — Henry Tsang
(74) *Attorney, Agent, or Firm* — J.C. PATENTS

(57) ABSTRACT

The present application discloses a method and apparatus for updating a password of an electronic device, a device, and a storage medium, and relates to intelligent transportation, vehicle-road collaboration, and device security technologies in the field of data processing. The specific implementation solution is: in response to detecting a trigger condition of a password update, the electronic device randomly generates a first password, and updates a login password of the electronic device to the first password; then the electronic device sends a password updating message to a server, and the password updating message is configured to indicate an identification of the electronic device and the first password. The server updates the database for storing login passwords of different electronic devices according to the password updating message. Through the above process, the safety of the electronic device is improved.

18 Claims, 9 Drawing Sheets

(51) Int. Cl.
    *H04L 9/08*     (2006.01)
    *H04L 9/32*     (2006.01)
    *G06F 21/31*     (2013.01)

(52) U.S. Cl.
    CPC .......... *H04L 9/0825* (2013.01); *H04L 9/0863* (2013.01); *H04L 9/3226* (2013.01)

(56) References Cited

U.S. PATENT DOCUMENTS

| | | |
|---|---|---|
| 2012/0254622 A1 | 10/2012 | Kanungo |
| 2015/0286816 A1 | 10/2015 | Adler |
| 2016/0352723 A1* | 12/2016 | Li .................. H04L 63/083 |
| 2017/0011214 A1* | 1/2017 | Cavanagh ........... H04L 63/0846 |
| 2018/0109378 A1* | 4/2018 | Fu .................. H04L 9/0897 |
| 2019/0174303 A1* | 6/2019 | Zhou .................. H04L 9/0822 |
| 2020/0167462 A1 | 5/2020 | Mehta |

FOREIGN PATENT DOCUMENTS

| | | |
|---|---|---|
| CN | 110826052 A | 2/2020 |
| CN | 110891062 A | 3/2020 |
| CN | 110943976 A | 3/2020 |
| CN | 111126533 A | 5/2020 |
| EP | 1472583 A2 | 11/2004 |
| JP | 2004259208 A | 9/2004 |
| JP | 2005107801 A | 4/2005 |
| JP | 2008233970 A | 10/2008 |
| JP | 2009116726 A | 5/2009 |
| JP | 2014239522 A | 12/2014 |
| JP | 2016535367 A | 11/2016 |
| JP | 2020089788 A | 6/2020 |
| KR | 20160030470 A | 3/2016 |
| WO | WO2018100652 A1 | 6/2018 |

OTHER PUBLICATIONS

First Office Action of the parallel application KR10-2021-0086403.
First Office Action of the parallel application JP2021-110576.
The EESR of EP application No. 21181679.8.
Appeal Decision of the parallel application JP2021-110576.
First Office Action of the priority application CN202011496887.X.

* cited by examiner

METHOD AND APPARATUS FOR UPDATING PASSWORD OF ELECTRONIC DEVICE, DEVICE AND STORAGE MEDIUM

CROSS-REFERENCE TO RELATED APPLICATIONS

The present application claims priority to Chinese Patent Application No. 202011496887.X, which was filed on Dec. 17, 2020 and titled "method and apparatus for updating password of electronic device, device and storage medium". The disclosure of the above patent application is incorporated herein by reference in its entirety.

TECHNICAL FIELD

The present application relates to intelligent transportation, vehicle-road collaboration, and device security technologies in the field of data processing, in particular to a method and apparatus for updating a password of an electronic device, a device, and a storage medium.

BACKGROUND

In intelligent transportation scenarios, more electronic devices need to be deployed, such as on board unit (OBU), road side unit (RSU), artificial intelligence (AI) cameras, etc.

Generally, electronic devices provide login services so that maintenance personnel can log on to the electronic devices to set up and maintain the electronic devices. The login service corresponds to a password, which is used to authenticate the user's access authority to the electronic device. The electronic device is configured with an initial password when leaving factory, and the initial password is usually a well-known password or a password that can be deduced and guessed.

After the electronic devices are deployed in actual traffic scene, if the above-mentioned initial password is still applied, security of the electronic device cannot be guaranteed, which resulting the electronic device vulnerable to hacker attacks, thereby affecting traffic safety.

SUMMARY

The present application provides a method and apparatus for updating a password of an electronic device, a device, and a storage medium.

According to a first aspect of the present application, a method for updating a password of an electronic device is provided, including:
  in response to detecting a trigger condition of a password update, randomly generating a first password;
  updating a login password of the electronic device to the first password; and
  sending a password updating message, where the password updating message is configured to indicate an identification of the electronic device and the first password.

According to a second aspect of the present application, a method for updating a password of an electronic device is provided, including:
  receiving a password updating message, where the password updating message is configured to indicate an identification of the electronic device and a first password, and the first password is randomly generated by the electronic device in response to detecting a trigger condition of a password update; and
  updating a database according to the password updating message, where the database is configured to store login passwords of different electronic devices.

According to a third aspect of the present application, an apparatus for updating a password of an electronic device is provided, including:
  a generating module, configured to randomly generate a first password in response to detecting a trigger condition of a password update;
  an updating module, configured to update a login password of the electronic device to the first password; and
  a sending module, configured to send a password updating message, where the password updating message is configured to indicate an identification of the electronic device and the first password.

According to a fourth aspect of the present application, an apparatus for updating a password of an electronic device is provided, including:
  a receiving module, configured to receive a password updating message, where the password updating message is configured to indicate an identification of the electronic device and a first password, and the first password is randomly generated by the electronic device in response to detecting a trigger condition of a password update;
  a processing module, configured to update a database according to the password updating message, where the database is configured to store login passwords of different electronic devices.

According to a fifth aspect of the present application, an electronic device is provided, including:
  at least one processor; and
  a memory communicatively connected with the at least one processor; where,
  the memory stores instructions that can be executed by the at least one processor, and the instructions are executed by the at least one processor, so that the at least one processor can perform any one of the method described in the first aspect, or perform the method described in any one of the second aspect.

According to a sixth aspect of the present application, a non-transitory computer-readable storage medium that stores computer instructions is provided, where the computer instructions are configured to enable the computer to perform any one of method described in the first aspect, or perform any one of the method described in the second aspect.

According to a seventh aspect of the present application, a computer program product including a computer program is provided, when executed by a processor, perform the method according to any one of the first aspects, or perform the method of any one in the second aspect.

The method and apparatus for updating a password of an electronic device, the device, and the storage medium are provided by the present application, and the method includes: in response to detecting a trigger condition of a password update, randomly generating a first password, updating a login password of the electronic device to the first password; and sending a password updating message, where the password updating message is configured to indicate an identification of the electronic device and the first password. In the above process, by dynamically updating the login password of the electronic device, the current login password of the electronic device is only valid for a short time, which reduces the security risks caused by the leakage of the login password; in addition, because the login password of the electronic device updated every time are generated randomly, which ensures that the login passwords of different electronic devices are different and irregular, so that the login password of one electronic device cannot be applied to other electronic devices, and cannot be used to deduct and guess the login passwords of the other electronic devices. The security of electronic device is further improved, thereby improving traffic safety.

It should be understood that the content described in this section is not intended to identify key or important features of the embodiments of the present application, nor is it intended to limit the scope of the present application. Other features of the present application will be easily understood through the following description.

BRIEF DESCRIPTION OF DRAWINGS

The drawings are intended to better understand the solution, and do not constitute a limitation to the present application, where.

DETAILED DESCRIPTION OF EMBODIMENTS

Figure 1:
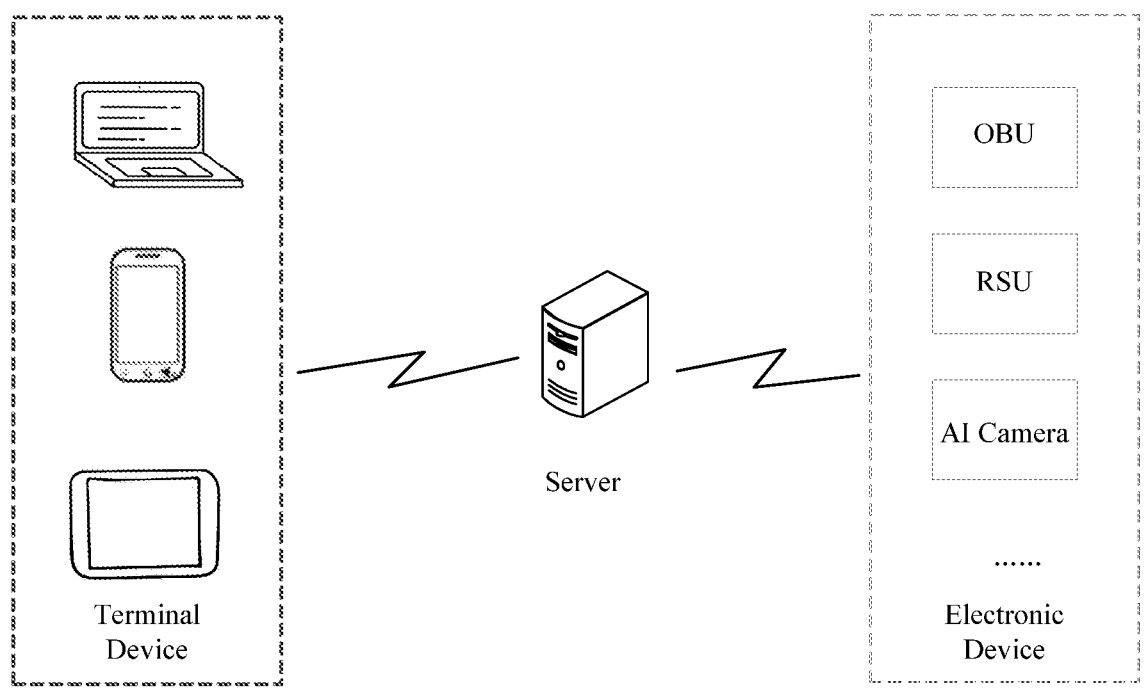
FIG. 1 is a system architecture schematic diagram applicable to an embodiment of the present application.

The following describes exemplary embodiments of the present application together with the accompanying drawings, which includes various details of the embodiments of the present application to help understanding, and which should be regarded as merely exemplary. Therefore, those of ordinary skill in the art should realize that various changes and modifications can be made to the embodiments described herein without departing from the scope and spirit of the present application. Likewise, for clarity and conciseness, descriptions of well-known functions and structures are omitted in the following description.

The present application provides a method and apparatus for updating a password of an electronic device, a device, and a storage medium, which is applied to the fields of intelligent transportation, vehicle-road collaboration, and device security in the field of data processing, so as to improve the security of electronic device.

An on board device and a roadside device are included in the system architecture of intelligent transportation and vehicle-road collaboration. The on board device includes an on board unit (OBU). OBU is used to realize vehicle to X (V2X) communication. The roadside device includes a roadside sensing device and a roadside computing device. The roadside sensing device (such as a roadside camera) is connected to the roadside computing device (such as a roadside computing unit (RSCU)), and the roadside computing device is connected to a server device, the server device can communicate with an autonomous driving vehicle or an assisted driving vehicle in various ways. In another system architecture, the roadside sensing device itself includes a computing function, and the roadside sensing device is directly connected to the server device. The above connection can be wired or wireless; the server device in the present application is, for example, a cloud control platform, a vehicle-road collaborative management platform, a central subsystem, an edge computing platform, a cloud computing platform, etc.

In the present application, the on vehicle devices and roadside devices deployed in the intelligent transportation scenarios are collectively referred to as electronic devices. The electronic devices include but are not limited to OBU, RSU, Mobile Edge Computing (MEC) device, network cameras, AI cameras, etc.

The above-mentioned electronic devices usually provide a login service, so that the maintenance personnel can log on to the electronic devices to set up and maintain the electronic devices. The login service corresponds to a password, when a user logs in to an electronic device, the password needs to be entered to authenticate the user's access authority to the electronic device. The electronic device is configured with an initial password when it leaves the factory, and the initial password is usually a well-known password or a password that can be deduced and guessed. For example, the initial password of some devices is "admin", the initial password of some devices is the last 6 digits of the serial number of the device, etc.

After the electronic device is deployed in actual traffic scene, if the above initial password is still used, the security of the electronic device cannot be guaranteed. Once hackers know the IP address of the device, they can easily use the initial password to invade the electronic device, and then attack the electronic device, such as publishing false V2X messages, maliciously causing traffic accidents, etc., thereby affecting traffic safety.

In some possible implementations, the initial password of the electronic device can be changed before the electronic device is deployed in actual traffic scene. Specifically, modify the initial passwords of electronic devices of the same type to the same sufficiently complex password. For example, change the initial passwords of all AI cameras to a sufficiently complex password containing uppercase and lowercase letters, numbers, and special symbols.

However, in the process of realizing the present application, the inventor found that even if the initial password is changed to a sufficiently complex password, the security of the electronic device is still low. The main security risks are as follows:

(1) The maintenance personnel need to maintain the electronic device on a regular or event-triggered basis, for example, log on to the electronic device to obtain logs, replace files, and perform problem diagnosis. Therefore, the maintenance personnel inevitably need to know the login password of the electronic device. After the maintenance personnel knows the login password of the electronic device, being carelessness of the maintenance personnel or resignation of the maintenance personnel may easily cause the leakage of the login password, which may cause security risks to the electronic device;

(2) since the login passwords of the electronic devices of the same type are the same, maintenance personnel can access other electronic devices of the same type as long as they know the login password of one of the electronic devices;

(3) there is a lack of records on when did the maintenance personnel visit which electronic device, and it is inconvenient to troubleshoot after a security problem occurs.

The present application provides a method for updating a password of an electronic device to improve the security of the electronic device. The system architecture of the present application will be described below with reference to FIG. 1.

FIG. 1 is a system architecture schematic diagram applicable to an embodiment of the present application. As shown in FIG. 1, the system architecture includes a server, electronic devices, and terminal devices. The electronic device and the server are communicatively connected. The terminal device and the server are communicatively connected.

The electronic device can be an on board device or a roadside device. The electronic device includes but is not limited to OBU, RSU, MEC, network camera, AI camera, etc.

The server can be a cloud control platform, a vehicle-road collaborative management platform, a central subsystem, an edge computing platform, a cloud computing platform, etc. The server can provide password storage services, so the server can be called a password management platform. The server may use distributed storage technology, or technology combined with blockchain. Apparently, the server can also use other storage technologies.

The terminal device can be an electronic device with information processing capabilities such as a smart phone, a tablet computer or a desktop computer. The terminal device can access the server through a web page or a client, and obtain information from the server.

In the embodiment of the present application, the electronic device randomly generates the first password in response to detecting the trigger condition of the password update, and updates the login password of the electronic device to the first password. Then, the electronic device sends a password updating message to the server, so that the server can store the updated login password of the electronic device. When the maintenance personnel need to log in to the electronic device, they can access the server through the terminal device and obtain the current login password of the electronic device from the server. Furthermore, the maintenance personnel can use the obtained current login password to log in to the electronic device, and perform operations such as setting or maintenance of the electronic device.

In the above process, the login password of the electronic device is no longer a static password, but will be dynamically updated with the trigger condition of the password update, so that the login password of the electronic device is only valid in a short time. Even if the maintenance personnel accidentally disclose the login password, it will only cause the electronic device to have a security risk in a short time. When the electronic device updates the login password next time, there is no security risk, which effectively reduces the hidden dangers of electronic device.

Furthermore, since the login passwords updated by the electronic devices are randomly generated each time, the login passwords of different electronic devices are different, and there is no regularity among the login passwords of different electronic devices. In this way, even if the maintenance personnel know the login password of one of the electronic devices, they cannot use the login password for other electronic devices, and cannot deduct the login passwords of other electronic devices based on the login password, which effectively controls the maintenance personnel's access to other electronic devices.

In addition, because the login password of the electronic device is dynamically updated, the maintenance personnel must query the current login password of the electronic device through the server before accessing the electronic device each time. Therefore, the server can determine which electronic devices the maintenance personnel have accessed during what time duration according to the query behavior of the maintenance personnel, so as to monitor the access behavior of the maintenance personnel.

The technical solution of the present application will be described in detail below in conjunction with several specific embodiments. The following specific embodiments can be combined with each other, and the same or similar concepts or processes may not be repeated in some embodiments.

Figure 2:
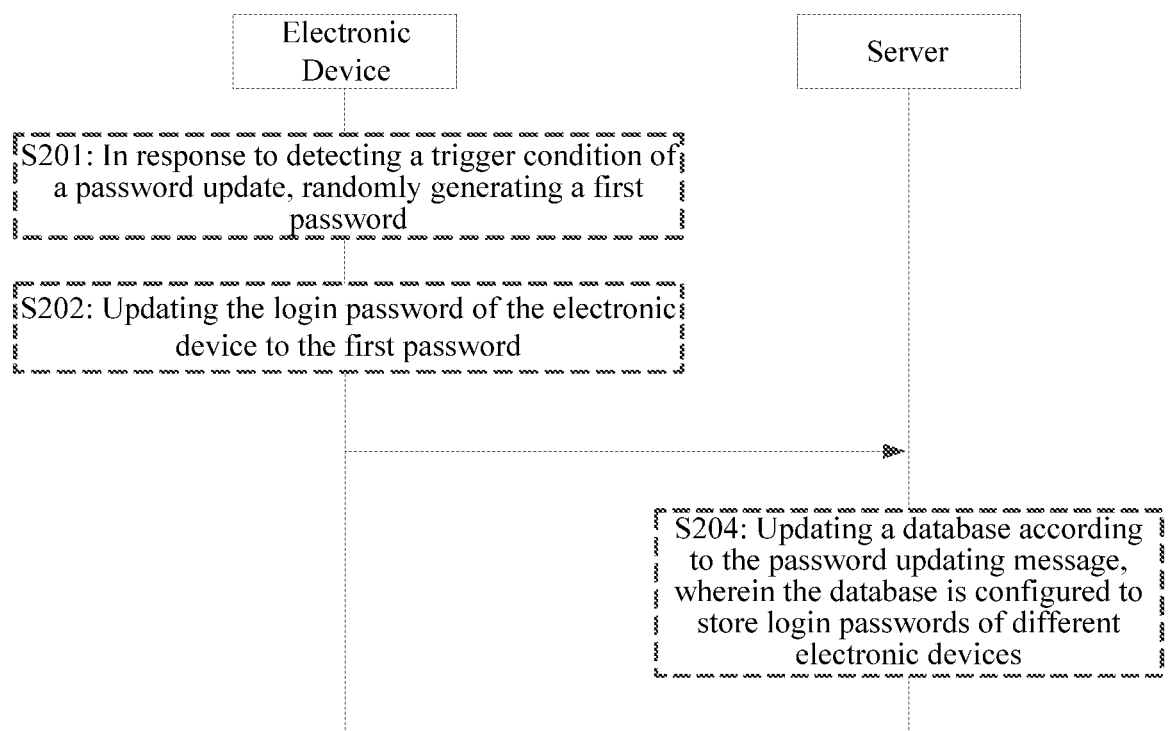
FIG. 2 is a schematic diagram of a method for updating a password of an electronic device provided by the present application.

FIG. 2 is a schematic diagram of a method for updating a password of an electronic device provided by the present application. As shown in FIG. 2, the method of the embodiment includes:

S201: The electronic device randomly generates a first password in response to detecting a trigger condition for password update;

S202: The electronic device updates the login password of the electronic device to the first password.

Optionally, the randomly generated first password satisfies a preset condition. The preset condition may include one or more of the following: (1) including a preset number of characters; (2) including uppercase and lowercase letters, numbers, and special characters.

The trigger condition of the password update is used to indicate the circumstances under which the login password of the electronic device needs to be updated. The trigger condition for the password update may be the default configuration of the electronic device, or it may be specified by the server and sent to the electronic device, or it may be specified by the user and written into the electronic device.

In a possible implementation, the login password is updated when the electronic device is detected to be powered on. In another possible implementation, the login password is updated when it is detected that use duration of a current login password of the electronic device reaches preset duration. The above two methods can also be used in combination.

Exemplarily, every time the electronic device is powered on, a new password is randomly generated, and the login password of the electronic device is updated to the new password. Then, start the timer, the duration of the timer is the preset duration (for example: 3 hours, 10 hours, 24 hours, etc.), every time the timer is detected, a new password is randomly generated, and the login password of electronic device is updated to the new password.

It can be understood that by dynamically updating the login password of the electronic device, the current login password of the electronic device is only valid for a short period of time, rather than using the same static login password for a long time as in the prior art. In this way, even if the maintenance personnel accidentally disclose the login password, it will only cause the electronic device to have a security risk in a short time. When the electronic device updates the login password next time, there will no longer be a security risk, which effectively reduce the safety hazards of the electronic device.

In addition, because the login passwords of the electronic devices updated every time are generated randomly, which ensures that the login passwords of different electronic devices are different, and there are no rules among the login passwords of different electronic devices. In this way, even if the maintenance personnel know the login password of one of the electronic devices, they cannot use the login password for other electronic devices, and cannot deduct the login passwords of other electronic devices based on the login password, which effectively controls the maintenance personnel's access to other electronic devices.

In some possible scenarios, some electronic devices may provide multiple login services, and each login service has a corresponding login password. Among them, the multiple login services include but are not limited to: login services based on Secure Shell (SSH), login services based on Telnet, and login services based on File Transfer Protocol (FTP), login service based on Secret File Transfer Protocol (SFTP), login service based on World Wide Web (WWW), etc.

In the embodiment, the first password corresponding to each login service can be randomly generated. For any first login service in the multiple login services, the login password of the first login service of the electronic device is changed to the first password corresponding to the first login service. In other words, the login password corresponding to each login service is dynamically updated randomly. In this way, the login passwords corresponding to multiple login services of the electronic device are different, and the security of the electronic device is further ensured.

Optionally, updating the login password of the electronic device to the first password may include: updating the current login password to the first password by invoking a password updating interface or command provided by the electronic device.

Exemplarily, for SSH-based login services, the passwd command can be invoked to update the login password. For WEB-based login services, the interface or command provided by the WEB service can be invoked to update the login password.

In the embodiment, the password update of the electronic device is realized by invoking the password updating interface or command provided by the electronic device, which is flexible and convenient, and can be applied to various types of electronic devices without deep customization of the electronic device system, suitable for all kinds of login services with good universality.

S203: The electronic device sends a password updating message to the server.

Correspondingly, the server receives a password updating message from the electronic device.

The password updating message is used to indicate the identification of the electronic device and the first password. Among them, the identification of the electronic device can be the name of the electronic device, or can be the address location description information of the electronic device, of course, it can also be other information of the electronic device, as long as the electronic device can be uniquely identified.

It should be noted that the embodiment does not limit the content and form of the password updating message, as long as the password updating message can indicate the identification of the electronic device and the first password.

It should be understood that when the electronic device provides multiple login services, the password updating message is used to indicate the identification of the electronic device and the first password corresponding to each login service. In the following example, an example is provided for a login service provided by the electronic device.

In an example, the password updating message may include the identification of the electronic device and the first password. In this way, the server can directly obtain the identification of the electronic device and the first password from the password updating message.

S204: The server updates the database according to the password updating message, where the database is configured to store login passwords of different electronic devices.

Exemplarily, after obtaining the identification and the first password of the electronic device according to the password updating message, the server stores the identification and the first password of the electronic device in the database. Alternatively, updating the password corresponding to the identification stored in the database to the first password.

In the embodiment, when the maintenance personnel need to log in to the electronic device, they can access the server through the terminal device and obtain the current login password of the electronic device from the server. Furthermore, the maintenance personnel can use the obtained current login password to log in to the electronic device, and perform setting or maintenance operations on the electronic device.

The method for updating a password of an electronic device provided in the embodiment includes: the electronic device randomly generates a first password in response to detecting a trigger condition of a password update, and updates the login password of the electronic device to the first password; and the electronic device sends a password updating message to a server, where the password updating message is used to indicate an identification of the electronic device and the first password. The server updates the database used to store the login passwords of different electronic devices according to the password updating message. In the above process, by dynamically updating the login password of the electronic device, the current login password of the electronic device is only valid for a short time, which reduces the security risks caused by the leakage of the login password; in addition, because the login password of the electronic device updated every time are generated randomly, which ensures that the login passwords of different electronic devices are different and irregular, so that the login password of one electronic device cannot be applied to other electronic devices, and cannot be used to deduct and guess the login passwords of the other electronic devices. The safety of electronic device is further improved, thereby improving traffic safety.

Figure 3:
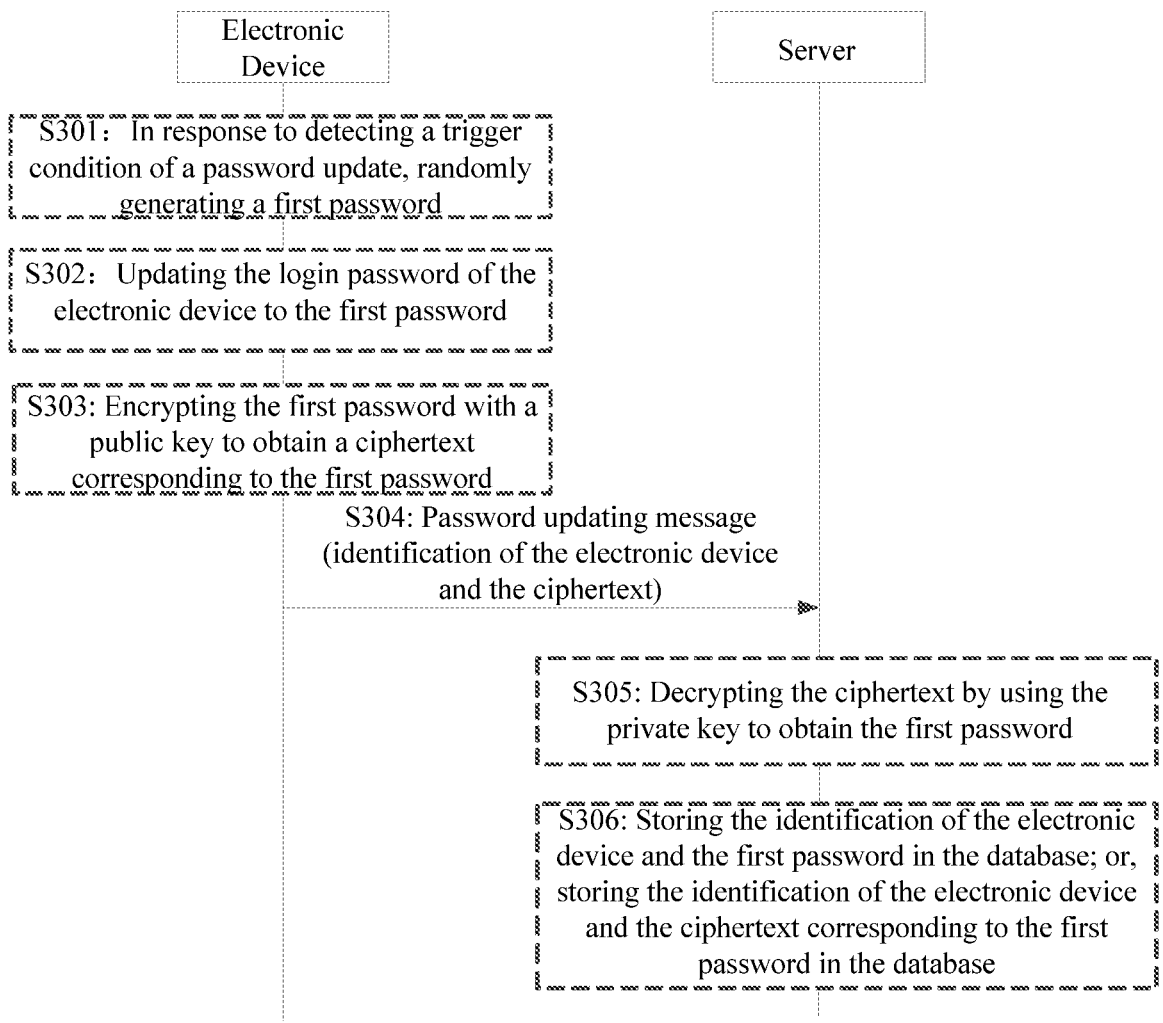
FIG. 3 is a schematic diagram of another method for updating a password of an electronic device provided by the present application.

FIG. 3 is a schematic diagram of another method for updating a password of an electronic device provided by the present application. On the basis of the foregoing embodiment, the embodiment performs encrypted transmission and storage of the first password to further improve the security of the electronic device. As shown in FIG. 3, the method of the embodiment includes:

S301: The electronic device randomly generates a first password in response to detecting a trigger condition of a password update;

S302: The electronic device updates the login password of the electronic device to the first password.

It should be understood that the specific implementations of S301 and S302 are similar to that of S201 and S202, and will not be repeated here.

S303: The electronic device encrypts the first password by using a public key to obtain a ciphertext corresponding to the first password.

S304: The electronic device sends a password updating message to the server, where the password updating message includes the identification of the electronic device and the ciphertext corresponding to the first password.

S305: The server decrypts the ciphertext by using the private key to obtain the first password.

Specifically, a public key may be deployed in the electronic device in advance, and the public key is used to encrypt the first password to obtain the ciphertext. A private key corresponding to the public key is deployed on the server side, and the server uses the private key to decrypt the ciphertext to obtain the first password.

In a possible implementation, the electronic device obtains the key identification; the electronic device encrypts the first password with the public key corresponding to the key identification to obtain the ciphertext corresponding to the first password.

The key identification can also be called "public-private key pair identification", that is, each key identification corresponds to a public key and a private key.

Optionally, when the electronic device is deployed, a key identification can be assigned to the electronic device, and the assigned key identification can be stored in the electronic device. In this way, when the electronic device needs to encrypt the first password, obtains the key identification stored by itself, encrypts the first password with the public key corresponding to the key identification, and obtains the ciphertext corresponding to the first password.

Exemplarily, a key identification may be assigned to an electronic device according to the type of the electronic device, and the key identifications assigned by different types of electronic devices may be different. For example, the key identification assigned by the AI camera is X1, the key identification assigned by the OBU is X2, the key identification assigned by the RSU is X3, and so on.

Optionally, the key identification can be assigned to the electronic device according to the region to which it belongs, and the key identification assigned by the electronic device in different regions can be different. For example, the key identification assigned by each electronic device in area 1 is X1, the key identification assigned by each electronic device in area 2 is X2, the key identification assigned by each electronic device in area 3 is X3, and so on.

There may be one or more key identifications assigned to each electronic device. Optionally, when multiple key identifications are assigned to an electronic device, the electronic device may randomly select a key identification from the multiple key identifications. Optionally, when an electronic device is assigned multiple key identifications, the electronic device may also select different key identifications for different login services.

In the various implementations described above, when the electronic device encrypts the first password with the public key corresponding to the key identification, and when the electronic device sends a password updating message to the server, the key identification may be carried in the password updating message. Correspondingly, after receiving the password updating message from the electronic device, the server can select a private key corresponding to the key identification to decrypt the ciphertext according to the key identification.

S306: The server stores the identification of the electronic device and the first password in the database; or, stores the identification of the electronic device and the ciphertext corresponding to the first password in the database.

In other words, the first password can be stored in the database, and the ciphertext corresponding to the first password can also be stored. It can be understood that storing the ciphertext of the first password in the database can make the security of the first password higher, because even if the data in the database is stolen, due to the ciphertext is stored in the database, the thief still cannot obtain the first password.

When the password updating message also includes the key identification, the server may also store the identification of the electronic device, the ciphertext corresponding to the first password, and the key identification in the database. In this way, when the user needs to query the login password of the electronic device, the ciphertext and the key identification corresponding to the electronic device can be queried from the database, and the ciphertext can be decrypted by using the private key corresponding to the key identification to obtain the first password.

In the embodiment, the login password of the electronic device is encrypted using the public key, and only the server holding the corresponding private key that can decrypt the login password. In the process of the electronic device sending the password updating message to the server, even if the communication link is hijacked by the hacker, the hacker cannot decrypt the login password based on the data obtained by the captured packet, which ensures the security of the login password.

In addition, by introducing key identification, different types of electronic devices can be deployed with different key identifications, or electronic devices in different regions can be deployed with different key identifications, or different login services can use different key identification, so as to achieve key isolation, reduce the scope of the key influence domain, and further increase the security of the electronic device.

The embodiments shown in FIG. 2 and FIG. 3 describe the process of the electronic device dynamically updating the login password and the server storing the login password. The following describes the process of the user querying the login password of the electronic device through the terminal device with reference to the embodiment shown in FIG. 4.

Figure 4:
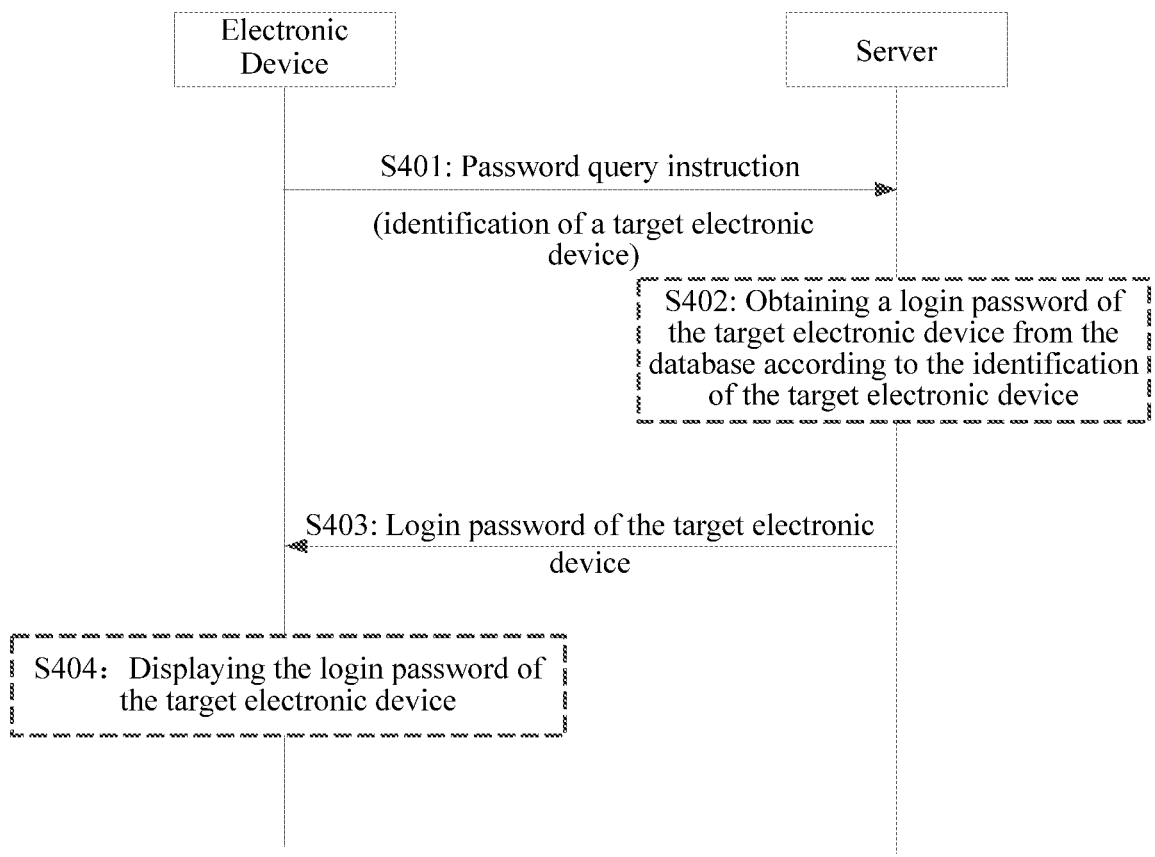
FIG. 4 is a schematic diagram of a process for obtaining a login password of an electronic device provided by the present application.

FIG. 4 is a schematic diagram of a process for obtaining a login password of an electronic device provided by the present application. As shown in FIG. 4, the method of the embodiment includes:

S401: The terminal device sends a password query instruction to the server, where the password query instruction includes an identification of a target electronic device.

The terminal device of the embodiment may be a terminal device of maintenance personnel. The client terminal of the password management platform may be deployed in the terminal device, or the terminal device may access the password management platform through a browser. The target electronic device is the electronic device for which the operator needs to query the login password.

Exemplarily, the terminal device sends a password query instruction to the server when detecting a query operation input by the user on the target electronic device.

Figure 5:
FIG. 5 is a schematic diagram of a display interface of a terminal device provided by the present application.

FIG. 5 is a schematic diagram of a display interface of a terminal device provided by the present application. The display interface may be the display interface of the terminal device of the maintenance personnel. As shown in FIG. 5, in the display interface, the maintenance personnel can input the identification of the target electronic device. When the terminal device detects that the maintenance personnel clicks the query button, it sends a password query instruction to the server, and the password query instruction carries the identification of the electronic device input by the maintenance personnel.

S402: The server obtains a login password of the target electronic device from the database according to the identification of the target electronic device.

After receiving the password query instruction from the terminal device, the server obtains the login password of the target electronic device by querying the database according to the identification of the target electronic device.

In some possible implementations, the ciphertext of the login password of multiple electronic devices is stored in the database. After obtaining the corresponding ciphertext by querying according to the identification of the target electronic device, the server uses the private key to decrypt the ciphertext to obtain the login password.

In other possible implementations, the ciphertext of the login passwords of multiple electronic devices and the corresponding key identifications are stored in the database. After obtaining the corresponding ciphertext by querying according to the identification of the target electronic device, the server uses the private key corresponding to the key identification to decrypt the ciphertext to obtain the current login password.

S403: The server sends the login password of the target electronic device to the terminal device.

S404: The terminal device displays the login password of the target electronic device.

As shown in FIG. 5, after receiving the login password of the target electronic device from the server, the terminal device displays the login password in the display interface. In this way, after the maintenance personnel know the login password, the login password can be used to log in to the electronic device to perform related operations.

In a possible implementation, the password query instruction also includes the user's (i.e., maintenance personnel) identification. Before querying the database, the server can also determine, according to the identification of the user, that the user has the authority to query the login password of the target electronic device.

Specifically, an authority list can be stored in the server, and the authority list is used to record each user (maintenance personnel) having the authority to query the login password of which electronic devices. The authority list can be configured and maintained by the administrator of the server. Specifically, for each electronic device, it is possible to individually set which maintenance personnel have the query authority of the login password, so as to achieve fine-grained control of the access authority of the electronic device.

If the server determines that the user does not have the authority to query the login password of the target electronic device, it may return prompt information to the terminal device to remind the user that the user does not have the query authority.

By judging the user authority, the user can only query the login password of the electronic device within the scope of his authority, thereby ensuring the security of the electronic device.

In a possible implementation, after the server receives the password query instruction from the terminal device, it further includes: generating a password query record, and writing the password query record into a log file. The password query record is used to record the user's behavior of querying the login password of the electronic device. The password query record may include the identification of the user and the identification of the electronic device that the user queries.

Optionally, the password query record may also include: authentication result. The authentication result refers to the result of judging whether the user has the query authority for the login password of the electronic device.

Figure 6:
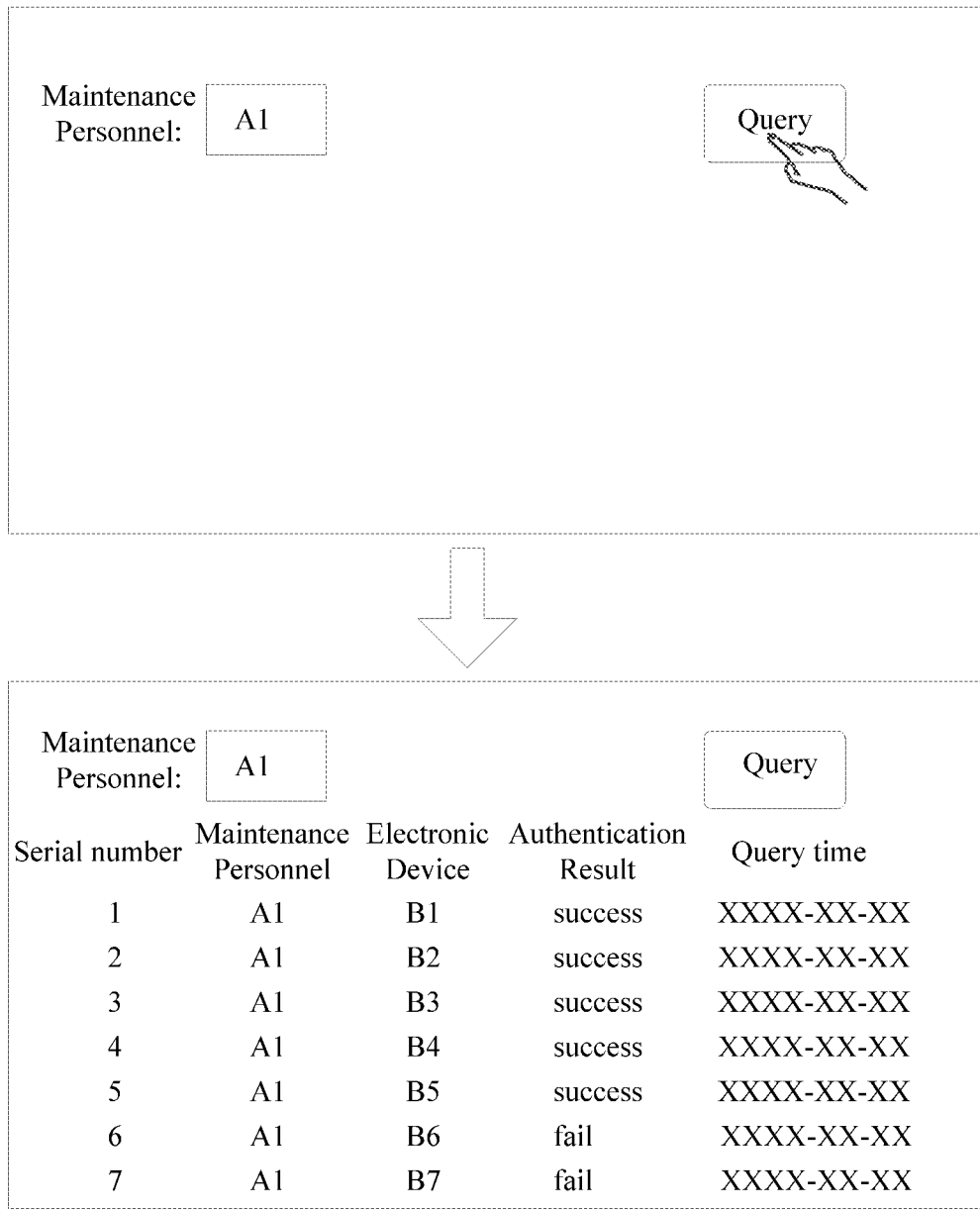
FIG. 6 is a schematic diagram of a display interface of another terminal device provided by the present application.

FIG. 6 is a schematic diagram of a display interface of another terminal device provided by the present application. The interface may be the display interface of the administrator's terminal device. The administrator can query the historical query behavior of a certain maintainer through the display interface. As shown in FIG. 6, the interface displays: the maintenance personnel identified as A1 has queried the login passwords of 7 electronic devices. The identifications of the seven electronic devices are B1, B2, B3, B4, B5, B6, and B7. Among them, the maintenance person has the inquiry authority of the electronic devices B1, B2, B3, B4, and B5, but does not have the query authority of the electronic devices B6, B7.

In the embodiment, the query behavior of the user is recorded in the log file, so that the query can be performed when needed later. For example, when a problem occurs in the operation of an electronic device, the maintenance personnel who visited the electronic device last time can be quickly traced according to the log file, and the operations and settings performed by the maintenance personnel can be confirmed so as to quickly solve the problem. In addition, the log file can also be used to count and analyze the query behavior of a maintenance personnel (such as a maintenance personnel's frequent and multi-device query behavior), so as to detect abnormal behaviors of the maintenance personnel in a timely manner, thereby reducing the risk of the electronic device being accessed abnormally.

In practical applications, the server can also automatically synchronize the in-service status information of the maintenance personnel. When the maintenance personnel resign, their account on the password management platform will be automatically cancelled, so that the resigned maintenance personnel can no longer obtain the latest login password of the electronic device. Since the login password is dynamically updated, the resigned maintenance personnel cannot use the previously obtained login password to continue to access the electronic device, thereby realizing the authority withdrawal of the resigned maintenance personnel.

On the basis of any of the foregoing embodiments, the solution of the present application will be illustrated with a specific example below in conjunction with FIG. 7.

Figure 7:
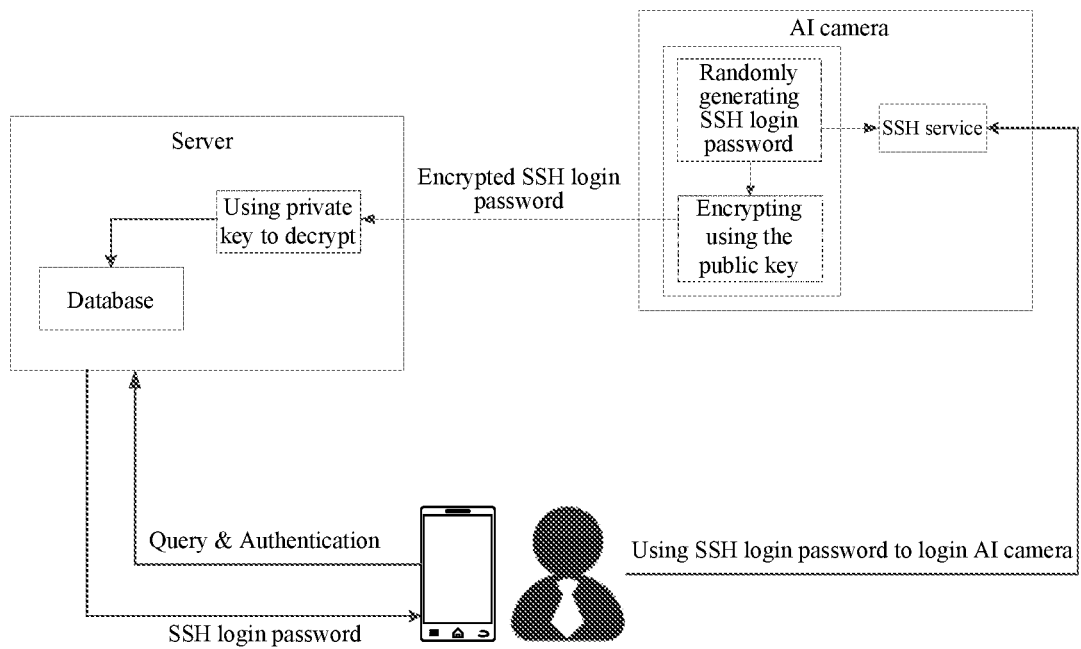
FIG. 7 is a schematic diagram of a password updating process of an electronic device provided by the present application.

FIG. 7 is a schematic diagram of a password updating process of an electronic device provided by the present application. As shown in FIG. 7, taking the AI camera as an example, it is assumed that the AI camera provides SSH login service. The AI camera randomly generates an SSH login password every time it is powered on or during every preset time period, and sets the newly generated SSH login password as the current login password. The AI camera uses the public key to encrypt the newly generated SSH login password to obtain the ciphertext, and sends the identification of the AI camera and the encrypted SSH login password to the server. The server uses the private key to decrypt the ciphertext, and if the decryption is successful, the AI camera ID and ciphertext are stored in the database.

When the user needs to access the AI camera, the user sends the ID of the AI camera to the server through the terminal device. The server obtains the ciphertext corresponding to the AI camera from the database according to the identification, decrypts the ciphertext with the private key to obtain the SSH login password, and sends the SSH login password to the terminal device. The terminal device displays the SSH login password, so that the user knows the SSH login password of the AI camera. Furthermore, the user can use the SSH login password to access the AI camera to perform related operations on the AI camera.

It should be noted that the process in which the server uses the private key to decrypt the ciphertext in any of the foregoing embodiments may be implemented by a Key Management System (KMS). Specifically, the server invokes the decryption interface provided by KMS to decrypt the ciphertext. The server does not directly obtain the private key, the private key is always stored in the KMS, the private key is only involved in calculations within the KMS and is never exposed to the outside. That is, the server can only use the private key for decryption, but cannot directly obtain the private key. Even if a hacker invades the server, the hacker cannot obtain the private key due to the protection of KMS, which ensures the security of the login password.

Figure 8A:
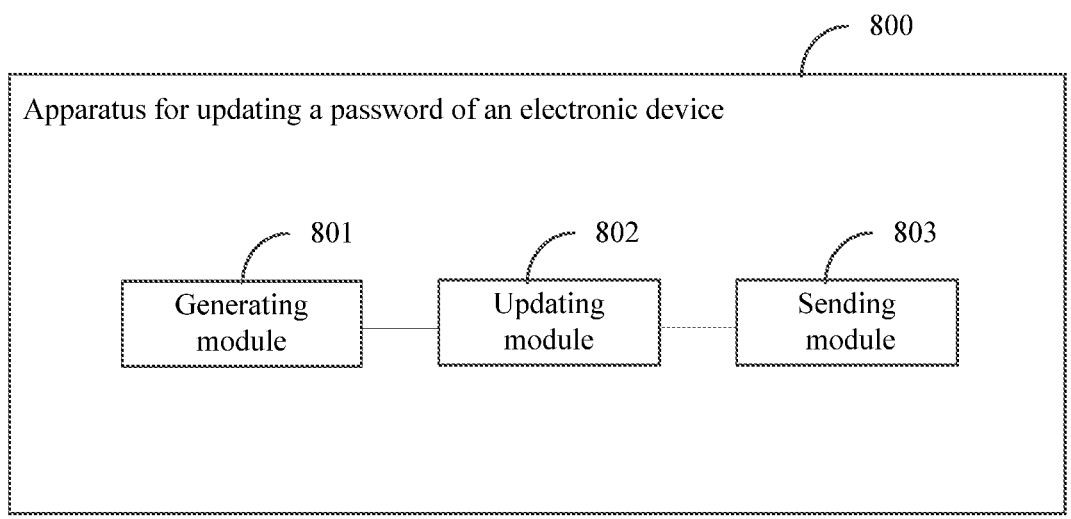
FIG. 8A is a schematic structural diagram of an apparatus for updating a password of an electronic device for electronic device provided by the present application.

FIG. 8A is a schematic structural diagram of an apparatus for updating a password of an electronic device provided by the present application. The apparatus in the embodiment may be in the form of software and/or hardware. The device of the embodiment may be installed in an electronic device. As shown in FIG. 8A, the apparatus 800 for updating a password of an electronic device provided in the embodiment includes: a generating module 801, an updating module 802, and a sending module 803.

The generating module 801 is configured to randomly generate a first password in response to detecting a trigger condition of a password update;

the updating module 802 is configured to update the login password of the electronic device to the first password;

the sending module 803 is configured to send a password updating message, where the password updating message is used to indicate an identification of the electronic device and the first password.

In a possible implementation, the generating module 801 is specifically configured to:

randomly generate the first password after detecting that the electronic device is powered on, or detecting that use duration of a current login password of the electronic device reaches preset duration.

In a possible implementation, the electronic device provides multiple login services; the generating module 801 is specifically configured to randomly generate the first password corresponding to each of the login services;

the updating module 802 is specifically configured to: for any first login service among the multiple login services, update a login password of the first login service of the electronic device to be a first password corresponding to the first login service.

Figure 8B:
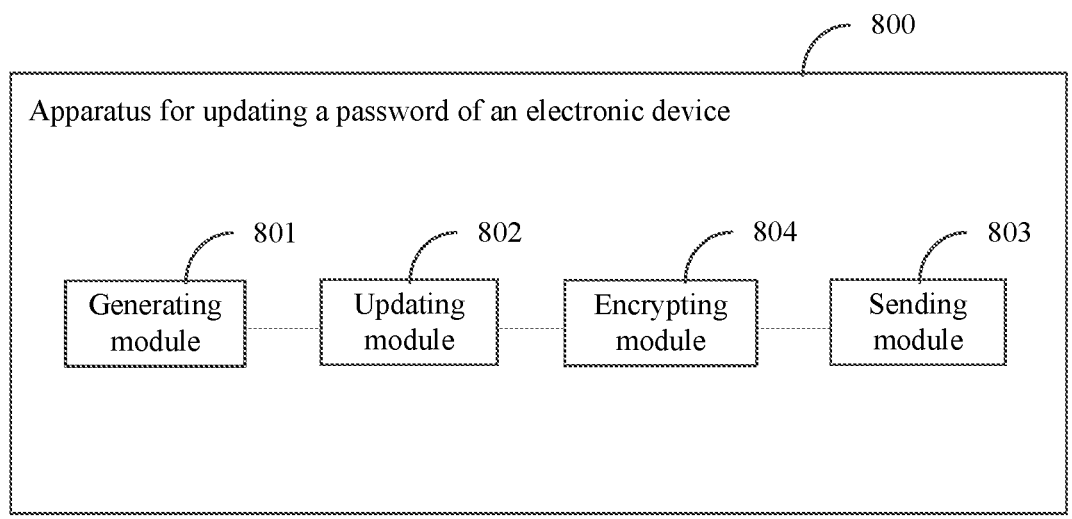
FIG. 8B is a schematic structural diagram of another apparatus for updating a password of an electronic device provided by the present application.

FIG. 8B is a schematic structural diagram of another apparatus for updating a password of an electronic device provided by the present application. On the basis of the embodiment shown in FIG. 8A, as shown in FIG. 8B, the password update apparatus 800 of the electronic device provided in the embodiment may further include an encrypting module 804.

The encrypting module 804 is configured to encrypt the first password with a public key to obtain a ciphertext corresponding to the first password;

the password updating message includes an identification of the electronic device and the ciphertext corresponding to the first password.

In a possible implementation, the encrypting module 804 is specifically configured to:

obtain a key identification;

encrypt the first password by using the public key corresponding to the key identification to obtain the ciphertext corresponding to the first password;

the password updating message further includes the key identification.

The apparatus shown in FIG. 8A and FIG. 8B can be used to execute the method executed by the electronic device in any of the foregoing method embodiments. The implementation principles and technical effects are similar, and will not be repeated here.

Figure 9A:
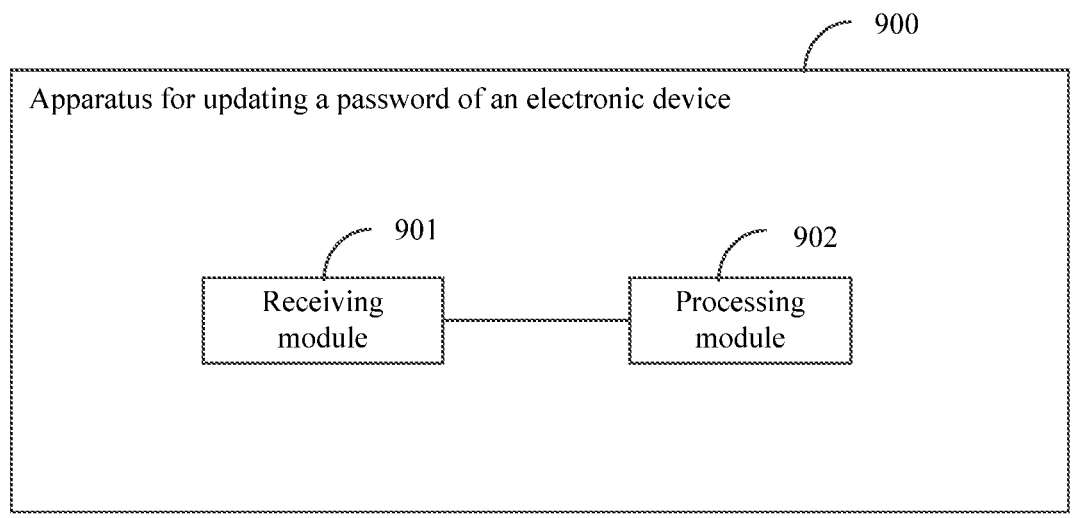
FIG. 9A is a schematic structural diagram of yet another apparatus for updating a password of an electronic device provided by the present application.

FIG. 9A is a schematic structural diagram of yet another apparatus for updating a password of an electronic device provided by the present application. The device in the embodiment may be in the form of software and/or hardware. The device of the embodiment can be installed in a server. As shown in FIG. 9A, the apparatus 900 for updating a password of an electronic device provided in the embodiment includes a receiving module 901 and a processing module 902.

The receiving module 901 is configured to receive a password updating message, the password updating message is configured to indicate an identification of the electronic device and a first password, and the first password is randomly generated by the electronic device in response to detecting a trigger condition of a password update;

the processing module 902 is configured to update a database according to the password updating message, where the database is configured to store login passwords of different electronic devices.

In a possible implementation, the password updating message includes the identification of the electronic device and a ciphertext corresponding to the first password; where the processing module 902 is specifically configured to:

decrypt the ciphertext using a private key to obtain the first password;

store the identification of the electronic device and the ciphertext in the database, or store the identification of the electronic device and the first password in the database.

In a possible implementation, the password updating message further includes a key identification; the processing module 902 is specifically configured to:

decrypt the ciphertext by using the private key corresponding to the key identification to obtain the first password;

store the identification of the electronic device, the ciphertext, and the key identification in the database.

Figure 9B:
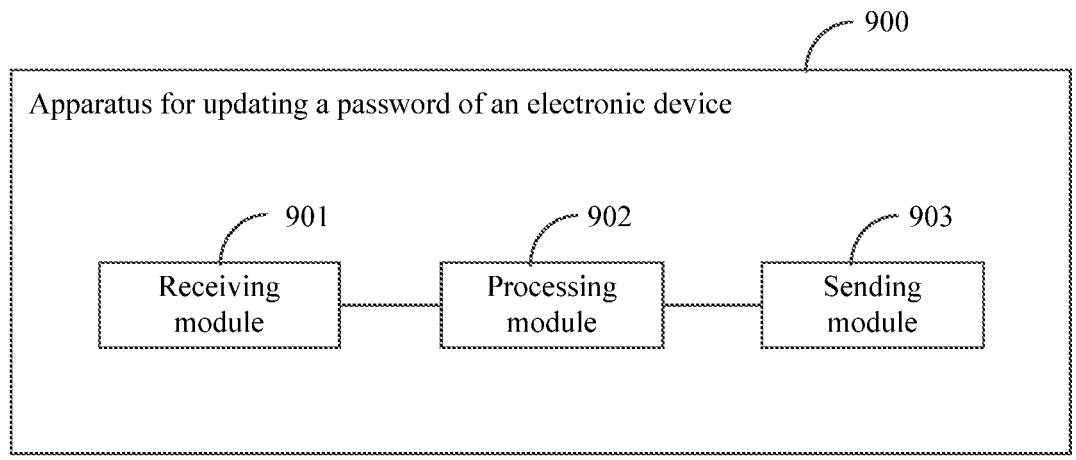
FIG. 9B is a schematic structural diagram of further another apparatus for updating a password of an electronic device provided by the present application.

FIG. 9B is a schematic structural diagram of further another apparatus for updating a password of an electronic device provided by the present application. As shown in FIG. 9B, based on the embodiment shown in FIG. 9A, the apparatus of the embodiment may further include: a sending module 903.

The receiving module 901 is further configured to receive a password query instruction, where the password query instruction includes the identification of the target electronic device;

the processing module 902 is further configured to obtain the login password of the target electronic device from the database according to the identification of the target electronic device;

the sending module 903 is configured to send the login password of the target electronic device.

In a possible implementation, the password query instruction further includes an identification of a user; the processing module 902 is further configured to:

before obtaining the login password of the target electronic device from the database according to the identification of the target electronic device, determine, according to the identification of the user, that the user has authority to query the login password of the target electronic device.

In a possible implementation, the processing module 902 is further configured to:

generate a password query record, where the password query record includes the identification of the user and the identification of the electronic device;

write the password query record to a log file.

The devices shown in FIG. 9A and FIG. 9B can be used to implement the method executed by the server in any of the foregoing method embodiments, and the implementation principles and technical effects are similar, and will not be repeated here.

According to an embodiment of the present application, the present application also provides an electronic device, including: at least one processor; and a memory communicatively connected with the at least one processor; where the memory stores an instruction executable by the at least one processor, and the instruction is executed by the at least one processor, so that the at least one processor can execute the method executed by the electronic device in the foregoing method embodiment. The implementation principle and technical effect are similar, and will not be repeated here.

According to an embodiment of the present application, the present application also provides an electronic device, including: at least one processor; and a memory communicatively connected with the at least one processor; where the memory stores an instruction executable by the at least one processor, and the instruction is executed by the at least one processor, so that the at least one processor can execute the method executed by the server in the foregoing method embodiment. The implementation principle and technical effect are similar, and will not be repeated here.

According to an embodiment of the present application, the present application also provides a non-transitory computer-readable storage medium storing computer instructions, where the computer instructions are used to enable the computer to execute the method executed by the electronic device in the foregoing method embodiment, or the method executed by the server in the foregoing method embodiment. The implementation principle and technical effect are similar, and will not be repeated here.

According to an embodiment of the present application, the present application also provides a computer program product, including a computer program, which when executed by a processor, executes the method executed by the electronic device in the foregoing method embodiment, or executes the method executed by the server in the foregoing method embodiment. The implementation principle and technical effect are similar, and will not be repeated here.

Figure 10:
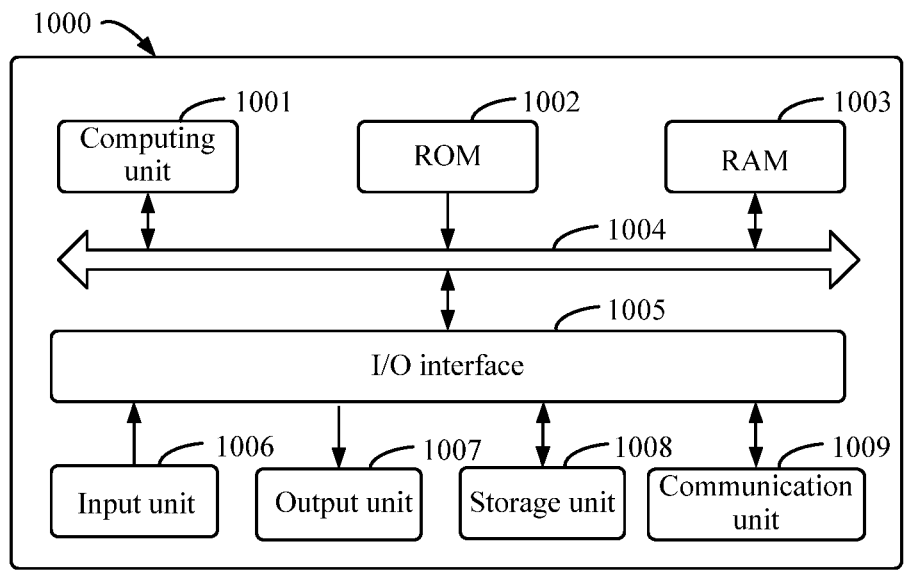
FIG. 10 is a schematic structural diagram of an electronic device provided by the present application.

FIG. 10 shows a schematic block diagram of an exemplary electronic device 1000 that can be used to implement embodiments of the present application. Electronic devices are intended to represent various forms of digital computers, such as laptop computers, desktop computers, workstations, personal digital assistants, servers, blade servers, mainframe computers, and other suitable computers. Electronic devices can also represent various forms of mobile devices, such as personal digital assistants, cellular phones, smart phones, wearable devices, and other similar computing devices. The components shown herein, their connections and relationships, and their functions are merely examples, and are not intended to limit the implementation of the present application described and/or required herein.

As shown in FIG. 10, the electronic device 1000 includes a computing unit 1001, which can be based on a computer program stored in a read-only memory (ROM) 1002 or loaded from a storage unit 1008 into a random access memory (RAM) 1003, to perform various appropriate actions and processing. In the RAM 1003, various programs and data required for the operation of the device can also be stored. The calculation unit 1001, the ROM 1002, and the RAM 1003 are connected to each other through a bus 1004. An input/output (I/O) interface 1005 is also connected to the bus 1004.

A number of components in the device are connected to the I/O interface 1005, including: an input unit 1006, such as a keyboard, a mouse, etc.; an output unit 1007, such as various types of displays, speakers, etc.; a storage unit 1008, such as a disk, optical disc, etc.; and communication unit 1009, such as network card, modem, wireless communication transceiver, etc. The communication unit 1009 allows the device to exchange information/data with other devices through a computer network such as the Internet and/or various telecommunication networks.

The computing unit 1001 may be various general-purpose and/or special-purpose processing components with processing and computing capabilities. Some examples of computing unit 1001 include, but are not limited to, central processing unit (CPU), graphics processing unit (GPU), various dedicated artificial intelligence (AI) computing chips, various computing units that run machine learning model algorithms, digital signal processing (DSP), and any appropriate processor, controller, microcontroller, etc. The calculation unit 1001 executes the various methods and processes described above, such as the method for updating a password of an electronic device. For example, in some embodiments, the method for updating a password of an electronic device can be implemented as a computer software program, which is tangibly contained in a machine-readable medium, such as the storage unit 1008. In some embodiments, part of or all of the computer program may be loaded and/or installed on the device via the ROM 1002 and/or the communication unit 1009. When the computer program is loaded into the RAM 1003 and executed by the computing unit 1001, one or more steps of the method for updating a password of an electronic device described above can be executed. Alternatively, in other embodiments, the computing unit 1001 may be configured to execute the method for updating a password of an electronic device in any other suitable manner (for example, by means of firmware).

Various implementations of the systems and technologies described herein above can be implemented in digital electronic circuit systems, integrated circuit systems, field programmable gate arrays (FPGA), application-specific integrated circuits (ASIC), application-specific standard products (ASSP), system on chip (SOC), complex programmable logic device (CPLD), computer hardware, firmware, software, and/or a combination thereof. These various embodiments may include: implemented in one or more computer programs, the one or more computer programs may be executed and/or interpreted on a programmable system including at least one programmable processor, the programmable processor can be a dedicated or general-purpose programmable processor that can receive data and instructions from storage system, at least one input device, and at least one output device, and transmit the data and instructions to the storage system, the at least one input device, and the at least one output device.

The program code used to implement the method of the present application can be programmed in any combination of one or more programming languages. These program codes can be provided to the processors or controllers of general-purpose computers, special-purpose computers, or other programmable data processing devices, so that when the program codes are executed by the processor or controller, the functions/operations specified in the flowchart and/or block diagrams are implemented. The program code can be executed entirely on the machine, partly executed on the machine, partly executed on the machine and partly executed on the remote machine as an independent software package, or entirely executed on the remote machine or server.

In the context of the present application, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination above. More specific examples of machine-readable storage media may include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination above.

In order to provide interaction with the user, the system and technology described herein can be implemented on a computer that has: a display device for displaying information to the user (for example, a cathode ray tube (CRT) or liquid crystal display (LCD) Monitor); and a keyboard and pointing device (for example, a mouse or trackball) through which the user can provide input to the computer. Other types of devices can also be used to provide interaction with the user; for example, the feedback provided to the user can be any form of sensory feedback (for example, visual feedback, auditory feedback, or tactile feedback); and can be in any form (including acoustic input, voice input, or tactile input) to receive input from the user.

The systems and technologies described herein can be implemented in a computing system that includes back-end components (for example, as a data server), or a computing system that includes middleware components (for example, an application server), or a computing system that includes front-end components (for example, a user computer with a graphical user interface or a web browser, through which the user can interact with the implementation of the system and technology described herein), or include such background components, intermediate components, or front-end components of any combination in a computing system. The components of the system can be connected to each other through any form or medium of digital data communication (for example, a communication network). Examples of communication networks include: local area network (LAN), wide area network (WAN), and the Internet.

The computer system may include a client and a server. The client and server are generally far away from each other and usually interact through a communication network. The relationship between the client and the server is generated by computer programs running on the corresponding computers and having a client-server relationship with each other. The server can be a cloud server, also known as a cloud computing server or a cloud host, it is a host product in the cloud computing service system to solve the shortcoming of difficult management and weak business scalability in the traditional physical host and VPS service ("Virtual Private Server", or "VPS" for short). The server can also be a server of a distributed system, or a server combined with a blockchain.

According to an embodiment of the present application, the present application also provides a transportation device, which includes the electronic device provided in FIG. 10.

For example, the transportation device includes a processor and a memory. The memory are used to store programs; the memory may include volatile memory, such as random access memory, static random access memory, double data rate synchronous dynamic random access memory, etc.; memory can also include non-volatile memory, such as flash memory. The memory is used to store computer programs (such as application programs and functional modules that implement the foregoing methods), computer instructions, etc., and the above computer programs, computer instructions, etc. may be partitioned and stored in one or more memories. And the above-mentioned computer programs, computer instructions, data, etc. can be invoked by the processor.

The above-mentioned computer programs, computer instructions, etc. may be partitioned and stored in one or more memories. And the above-mentioned computer program, computer data, etc. can be invoked by the processor.

In the transportation device, a processor is configured to execute a computer program stored in a memory to implement each step in the method involved in the foregoing embodiment.

Please refer to the relevant description in the previous method embodiment for details.

In the transportation device, the processor and memory can be independent structures, or they can be integrated structures. When the processor and the memory are independent structures, the memory and the processor may be coupled and connected through a bus.

The transportation device of the embodiment can execute the technical solutions in the foregoing methods, the specific implementation process and technical principles are the same, and will not be repeated herein.

It should be understood that the various forms of processes shown above can be used to reorder, add or delete steps. For example, the steps described in the present application can be executed in parallel, sequentially, or in a different order, as long as the desired result of the technical solution disclosed in the present application can be achieved, and is not limited herein.

The above specific implementations do not constitute a limitation on the scope of protection of the present application. Those skilled in the art should understand that various modifications, combinations, sub-combinations and substitutions can be made according to design requirements and other factors. Any modification, equivalent replacement and improvement made within the spirit and principle of the present application shall be included in the protection scope of the present application.

What is claimed is:

1. A method for updating a password of an electronic device, comprising:
   in response to detecting a trigger condition of a password update, randomly generating a first password;
   updating a login password of the electronic device to the first password; and
   sending a password updating message to a server, and enabling a user to query the first password from the server, wherein the password updating message is configured to indicate an identification of the electronic device and the first password;
   wherein the electronic device provides multiple login services, and each login service has the corresponding first password; and the randomly generating the first password comprises:
   randomly generating the first password corresponding to each of the login services respectively;
   the updating the login password of the electronic device to the first password comprises:
   for any first login service among the multiple login services, updating a login password of the first login service of the electronic device to be the first password corresponding to the first login service, wherein multiple login passwords corresponding to the multiple login services are different;
   wherein the detecting the trigger condition of the password update comprises:
   detecting that the electronic device is powered on.

2. The method according to claim 1, wherein before the sending the password updating message, further comprising:
   encrypting the first password with a public key to obtain a ciphertext corresponding to the first password;
   wherein the password updating message comprises an identification of the electronic device and the ciphertext corresponding to the first password.

3. The method according to claim 2, wherein the encrypting the first password with the public key to obtain the ciphertext corresponding to the first password comprises:
   obtaining a key identification;
   encrypting the first password by using the public key corresponding to the key identification to obtain the ciphertext corresponding to the first password;
   wherein the password updating message further comprises the key identification.

4. The method according to claim 3, wherein the key identification is assigned to the electronic device according to a type of the electronic device, and the key identifications assigned by different types of electronic devices are different.

5. The method according to claim 3, wherein the key identification is assigned to the electronic device according to a region to which it belongs, and the key identifications assigned by the electronic device in different regions are different.

6. The method according to claim 1, after the updating a login password of the electronic device to the first password, the method further comprises:
   starting a timer, wherein a duration of the timer is a preset duration, and every time the duration of the timer is reached, a second password is randomly generated, and the login password of the electronic device is updated to the second password.

7. The method according to claim 1, the multiple login services comprise login services based on Secure Shell (SSH), login services based on Telnet, login services based on File Transfer Protocol (FTP)login service based on Secret File Transfer Protocol (SFTP), and login service based on World Wide Web (WWW).

8. A non-transitory computer-readable storage medium storing computer instructions, wherein the computer instructions are configured to enable a computer to execute the method according to claim 1.

9. A method for updating a password of an electronic device, comprising:
   receiving a password updating message, wherein the password updating message is configured to indicate an identification of the electronic device and a first password, and the first password is randomly generated by the electronic device in response to detecting a trigger condition of a password update, and the first password is updated as a login password of the electronic device, and the electronic device provides multiple login services, each login service has the corresponding first password; and
   updating a database according to the password updating message, and enabling a user to query the first password from a server, wherein the database is configured to store multiple login passwords of different electronic devices, and the multiple login passwords corresponding to the multiple login services are different;
   wherein the detecting the trigger condition of the password update comprises:
   detecting that the electronic device is powered on.

10. The method according to claim 9, wherein the password updating message comprises the identification of the electronic device and a ciphertext corresponding to the first password;
    wherein the updating the database according to the password updating message comprises:
    storing the identification of the electronic device and the ciphertext in the database; or
    decrypting the ciphertext using a private key to obtain the first password, and storing the identification of the electronic device and the first password in the database.

11. The method according to claim 10, wherein the password updating message further comprises a key identification; wherein the decrypting the ciphertext using the private key to obtain the first password comprises:
    decrypting the ciphertext by using the private key corresponding to the key identification to obtain the first password;
    wherein the storing the identification of the electronic device and the first password in the database comprises:
    storing the identification of the electronic device, the first password and the key identification in the database.

12. The method according to claim 9, the method further comprises:
    receiving a password query instruction, wherein the password query instruction comprises an identification of a target electronic device;
    obtaining a login password of the target electronic device from the database according to the identification of the target electronic device; and
    sending the login password of the target electronic device.

13. The method according to claim 12, wherein the password query instruction further comprises an identification of a user; wherein before the obtaining the login password of the target electronic device from the database according to the identification of the target electronic device, further comprising:

determining, according to the identification of the user, that the user has authority to query the login password of the target electronic device.

14. The method according to claim 13, wherein after the receiving the password query instruction, further comprising:

generating a password query record, wherein the password query record comprises the identification of the user and the identification of the electronic device; and writing the password query record into a log file.

15. A non-transitory computer-readable storage medium storing computer instructions, wherein the computer instructions are configured to enable a computer to execute the method according to claim 9.

16. An electronic device for updating a password of the electronic device, comprising: at least one processor; and a memory communicatively connected with the at least one processor; wherein the memory stores an instruction executable by the at least one processor, the instruction is executed by the at least one processor, so that the at least one processor is configured to:

randomly generate a first password in response to detecting a trigger condition of a password update;

update a login password of the electronic device to the first password; and send a password updating message to a server, and enabling a user to query the first password from the server, wherein the password updating message is configured to indicate an identification of the electronic device and the first password;

wherein the electronic device provides multiple login services; and the processor is configured to:

randomly generate the first password corresponding to each of the login services respectively; and for any first login service among the multiple login services, update a login password of the first login service of the electronic device to be the first password corresponding to the first login service, wherein multiple login passwords corresponding to the multiple login services are different;

wherein the at least one processor is specifically configured to:

randomly generate the first password after detecting that the electronic device is powered on.

17. The electronic device according to claim 16, wherein the electronic device is further configured to:

encrypt the first password with a public key to obtain a ciphertext corresponding to the first password;

wherein the password updating message comprises an identification of the electronic device and the ciphertext corresponding to the first password.

18. The electronic device according to claim 17, wherein the at least one processor is specifically configured to:

obtain a key identification;

encrypt the first password by using the public key corresponding to the key identification to obtain the ciphertext corresponding to the first password;

wherein the password updating message further comprises the key identification.

* * * * *